United States Patent
Kambayashi et al.

(10) Patent No.: US 8,296,468 B2
(45) Date of Patent: *Oct. 23, 2012

(54) STORAGE CONTROLLER AND CONTROLLING METHOD THEREFOR

(75) Inventors: Kosaku Kambayashi, Odawara (JP); Dai Taninaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 13/248,064

(22) Filed: Sep. 29, 2011

(65) Prior Publication Data

US 2012/0023266 A1     Jan. 26, 2012

Related U.S. Application Data

(63) Continuation of application No. 12/216,086, filed on Jun. 30, 2008, now Pat. No. 8,051,225, which is a continuation of application No. 11/107,758, filed on Apr. 18, 2005, now abandoned.

(30) Foreign Application Priority Data

Feb. 23, 2005   (JP) ................................ 2005-047478

(51) Int. Cl.
*G06F 3/00*     (2006.01)
(52) U.S. Cl. .............................. 710/5; 710/38
(58) Field of Classification Search ....................... 710/38
See application file for complete search history.

(56) References Cited

U.S. PATENT DOCUMENTS

| | | | |
|---|---|---|---|
| 5,640,600 A | 6/1997 | Satoh et al. | |
| 5,717,950 A | 2/1998 | Yamaguchi et al. | |
| 6,209,043 B1 | 3/2001 | Sanemitsu | |
| 8,051,225 B2 * | 11/2011 | Kambayashi et al. | .......... 710/38 |
| 2003/0093509 A1 | 5/2003 | Li et al. | |
| 2004/0111485 A1 | 6/2004 | Mimatsu et al. | |
| 2007/0266184 A1 | 11/2007 | Yamada et al. | |
| 2009/0013112 A1 | 1/2009 | Kambayashi et al. | |

FOREIGN PATENT DOCUMENTS

EP          935375          8/1999

(Continued)

OTHER PUBLICATIONS

"Information Technology—SCSI Enclosure Services—2 (SES-2) Working Draft", T10 Technical Committee—Project T10/1559D, Jul. 22, 2004, pp. 1-76.

(Continued)

*Primary Examiner* — Henry Tsai
*Assistant Examiner* — John Roche
(74) *Attorney, Agent, or Firm* — Brundidge & Stanger, P.C.

(57) ABSTRACT

A storage controller that performs user-friendly information display, simplifies updating of support information, has external storage controllers to provide sufficient input/output performance, and expands the range of external storage controllers to be supported; and a controlling method for that storage controller. The storage controller includes a code extract/convert unit for converting a first code indicating a vendor name and/or device name of an external storage controller, obtained based on inquiry data transmitted from the external storage controller, into a second code indicating a real vendor name and/or real device name of the external storage controller. The storage controller creates support information that compiles information of each model regarding whether or not it can be connected to the respective external storage controllers. Furthermore, a path control system and a timeout time can be set for the respective external storage controllers.

12 Claims, 14 Drawing Sheets

FOREIGN PATENT DOCUMENTS

| | | |
|---|---|---|
| EP | 1357476 A2 | 10/2003 |
| JP | 9288547 | 11/1997 |
| JP | 10207817 | 8/1998 |
| JP | 10508967 | 9/1998 |
| JP | 2001337850 | 12/2001 |
| JP | 2003195940 | 7/2003 |
| JP | 2003256790 | 9/2003 |
| JP | 2004326342 | 11/2004 |
| JP | 2004326401 | 11/2004 |
| WO | 9709676 | 3/1997 |

OTHER PUBLICATIONS

T10 Vendor ID Assignments, T10 Technical Committee, Oct. 15, 2004, pp. 1-8.

* cited by examiner

FIG.7

| | | | PRODUCT NAME | AAA | | BBB/CCC | | DDD | . | EEE | FFF | GGG | HHH |
|---|---|---|---|---|---|---|---|---|---|---|---|---|---|
| | | | TITLE | ○○○ | ○×○ | △△△ | △○△ | ×○△ | - | ○□○ | ○○× | □□□ | △□× |
| | | | DEVELOPING CODE | aaa | bbb | ccc | ddd | eee | OTHER | fff | ggg | hhh | iii |
| VENDER NAME (Vendor) | vendor | | Config | 0 | 5 | 1 | 4 | 6 | 10 | 20 | 21 | 22 | 23 |
| | | PAGE | pagec | 0x00 | ↓ | ↓ | ↓ | ↓ | ↓ | 0x00 | 0x00 | 0x00 | 0x00 |
| | | BYTE POSITION | positionc | 0x0B | ↓ | ↓ | ↓ | ↓ | ↓ | 0x08 | 0x08 | 0x06 | 0x08 |
| | | NUMBER OF BYTES | lengthc | 0x08 | ↓ | ↓ | ↓ | ↓ | ↓ | ↓ | ↓ | ↓ | ↓ |
| | | CONTENT | datac | HATA | HATA | HATA | HATA | PP | OTHER | OMC | ABN | COM | ZAN |
| | | SCREEN DISPLAY | - | HATA | HATA | HATA | HATA | PP | OTHER | OMC | ABN | PP | ZAN |
| DEVICE NAME (Device Name) | devnamec | PAGE | pagec | 0x00 | ↓ | ↓ | ↓ | ↓ | ↓ | 0x00 | 0x00 | 0x00 | 0x00 |
| | | BYTE POSITION | positions | 0x24 | ↓ | ↓ | ↓ | ↓ | 0x16 | 0x10 | 0x10 | 0x10 | 0x10 |
| | | NUMBER OF BYTES | lengthc | 0x04 | ↓ | ↓ | ↓ | ↓ | 0x08 | 0x09 | 0x04 | 0x04 | 0x02 |
| | | CONTENT | datac | aaa | bbb | ccc | ddd | eee | OTHER | DDA | EE | □□□ | △□× |
| | | SCREEN DISPLAY | - | ○○○ | ○×○ | △△△ | △○△ | ×○△ | OTHER | ○□○ | EE | □□□ | △□× |
| SCAN NUMBER (ScanNumber) | devsent | PAGE | pagec | 0x60 | ↓ | ↓ | ↓ | ↓ | 0x80 | 0x82 | 0x80 | 0x84 | 0x84 |
| | | BYTE POSITION | positionc | 0x05 | ↓ | ↓ | ↓ | ↓ | 0x04 | 0x02 | 0x04 | 0x04 | 0x04 |
| | | NUMBER OF BYTES | lengthc | 0x05 | ↓ | ↓ | ↓ | ↓ | ↓ | 10 | 0x05 | 0x06 | 0x06 |
| | | ASCII-bin | ascbinc | 0x00 | ↓ | ↓ | ↓ | ↓ | ↓ | 0x01 | 0x00 | 0x00 | 0x00 |
| CHASSIS'S OWN SUPPORT/ NON-SUPPORT INFORMATION | supunfc(4) | SET AS BITMAPS FOR AAA, BBB, CCC, AND DDD RESPECTIVELY | | [0]0xe0 [1]0xe0 [2]0xe0 [3]0xe0 | | | | | [0]0x00 [1]0x00 [2]0x00 [3]0x00 | | [0]0xe0 [1]0xe0 [2]0xe0 [3]0xe0 | [0]0xa0 [1]0xa0 [2]0xa0 [3]0xa0 | [0]0xa0 [1]0xa0 [2]0xa0 [3]0xa0 |
| ALTERNATING PATH MODEL | alpthmdle | MULTI=0 SINGLE (1)=1 SINGLE (2)=2 | | 0 | | | 1 | | 0 | 2 | 1 | 0 | 0 |
| TIMEOUT THRESHOLD VALUE | tavs | | | 15 | | | ↓ | | ↓ | ↓ | ↓ | 20 | 30 |

|  | 0 | 1 | 2 | 3 | ... | 8 |
|---|---|---|---|---|---|---|
| [0] 0xe0 | 1 | 1 | 1 | 0 | ... | 0 |
| [1] 0xe0 | 1 | 1 | 1 | 0 | ... | 0 |
| [2] 0xa0 | 1 | 0 | 1 | 0 | ... | 0 |
| [3] 0x00 | 0 | 0 | 0 | 0 | ... | 0 |

SUPPORT/NONSUPPORT | ORDINARY | Hi-copy | RESERVED

FIG.11

| LU Operation | Port Operation | Cross-system Copy |

☐ LU Operation

⊘ SUBSYSTEM
└─▭ EXTERNALLY-CONNECTED DEVICES
　├─◯ HITACHI:9500V(10000)
　│　└─⧉ Discovery
　├─◯ HITACHI:9500V(10001)
　│　├─◯ E2
　│　└─⧉ Discovery
　├─◯ HITACHI:9500V(60256)
　│　└─⧉ Discovery
　├─◯ HITACHI:9500V(77777)
　│　├─▭ 19999000000000060
　│　├─◯ E7
　│　└─⧉ Discovery  ▭ 4567890ABCDEF123
　├─◯ HITACHI:9500V(99999)
　│　└─⧉ Discovery
　├─◯ HITACHI:9970V(28528)
　│　├─◯ E1
　│　└─⧉ Discovery
　├─◯ HITACHI:9980V(11111)
　│　├─◯ E1
　│　├─◯ E2
　│　└─⧉ Discovery
　└─◯ HITACHI:9980V(11112)
　　　├─◯ E1
　　　└─⧉ Discovery

~81

[DISPLAY FILTER]

| WWN | SCAN NUMBER | DEVICE NAME | VENDER |
|---|---|---|---|
| ▭ 4567890ABCDEF123 | 77777 | ◯×◯ | HATA |

DETECT WWN:1

PRESET

| WWN | LUN | GROUP | EMULATIONTYPE | LDEV | ERROR |
|---|---|---|---|---|---|
| ▭ 4567890ABCDEF123 | 0000 | E7-1 | OPEN-3 | 31 | |

OPERATING STATUS:LU ADDED　　PRESET NUMBER:1

[APPLY]　[CANCEL]

STORAGE CONTROLLER AND CONTROLLING METHOD THEREFOR

CROSS-REFERENCES TO RELATED APPLICATIONS

The present application is a continuation of application Ser. No. 12/216,086, filed Jun. 30, 2008 now U.S. Pat. No. 8,051,225; which is a continuation of application Ser. No. 11/107,758, filed on Apr. 18, 2005, now abandoned; which relates to and claims priority from Japanese Patent Application No. 2005-47478, filed on Feb. 23, 2005, the entire disclosure of which is incorporated herein by reference.

BACKGROUND OF THE INVENTION

The present invention relates to a storage controller and a controlling method therefor, particularly to a storage controller to which external storage controllers can be connected as externally-connected devices.

In database systems at a data center or similar, where a huge amount of data is dealt with, data is managed using storage systems that are configured separately from a host computer. A storage system is composed of, for example, one or more storage controllers. A storage controller is structured by arranging plural storage devices in arrays and configured based on, for example, the Redundant Array of Independent Inexpensive Disks (RAID) system. In a physical storage area provided by a storage device group, at least one or more logical volumes (logical units) are formed and provided to the host computer (or specifically, a database program operated on the host computer). The host computer transmits predetermined commands, thereby enabling the writing of data to, and the reading of data from, the logical volumes.

Lately, with the development of the information society, the amount of data that should be managed in a database is increasing and storage systems having higher efficiency and capacity have become desirable. Two major methods can be utilized for constructing a large-capacity storage system having high efficiency. One is a method for replacing existing small-capacity storage controllers with new, large-capacity storage controllers. For this method, a technique for transferring data in the database retained by the currently operating storage controllers to new storage controllers is disclosed in Japanese Unexamined Patent Publication No. H10-508967, Japanese Patent Laid-Open Publication No. 2001-337850, and Japanese Patent Laid-Open Publication No. H9-288547. The other method is to add a new storage controller to the existing storage systems. This method can be divided into two method types; one is a method for providing a new storage controller separately from the existing storage controllers; and the other is a method for connecting a new storage controller serially to the existing storage controllers.

Incidentally, Japanese Patent Laid-Open Publication No. 2001-337850 discloses a technique for managing storage areas of physical devices in sectors and dynamically configuring logical devices in sectors. Moreover, Japanese Patent Laid Open Publication No. H9-288547 discloses a technique for, when configuring logical devices with plural storage devices of different capacities, forming areas in accordance with a smallest capacity storage device and, for the remaining capacity, forming areas in accordance with a storage device that has the smallest capacity among the storage devices except for the smallest capacity storage device.

SUMMARY OF THE INVENTION

In the case where two storage controllers are serially connected and used as above, an operator of a host system can make an inquiry to one storage controller connected to the host system (hereinafter called the "first storage controller") regarding which type of storage controller is connected to the first storage controller.

In this case, an inquiry command is transmitted from the first storage controller to another storage controller (hereinafter called the "second storage controller") connected to the first storage controller, and, in response to this inquiry command, inquiry data is transmitted from the second storage controller to the first storage controller, the inquiry data including a vendor name, a device name, and a scan number of the second storage controller. Then, the first storage controller transmits, to the host system, codes for the vendor name and the device name of the second storage controller contained in the inquiry data. Consequently, the host system directly displays, on its display, the codes for the vendor name and the device name of the second storage controller that are extracted from the inquiry data.

However, the codes for the vendor name and the device name in the inquiry data transmitted from the second storage controller to the first storage controller are in many cases arbitrarily determined by the manufacturer of the second storage controller and unknown to the public, for example, as developing codes. Therefore, conventional storage systems have a problem in that an operator cannot immediately recognize the vendor name or the device name of the second storage controller even when he/she sees the codes for the vendor name and the device name displayed on the display of the host system.

Moreover, in the case of conventional storage controllers to which external storage controllers can be connected as externally-connected devices, information regarding which external storage controllers can be connected thereto (hereinafter called the "support information") is created for each model of storage controller. Incidentally, in the following description, external storage controllers that can be connected as externally-connected devices are called "external storage controllers to be supported".

Therefore, when the storage controller has plural model kinds and if a new external storage controller is connected to and shared between the respective models of the storage controllers, the support information of the respective models need to be updated separately. This updating work has required huge labor.

Moreover, with conventional storage controllers, the support information includes only the information of the external storage controllers to be supported. However, among other external storage controllers that are to be supported, there are some external storage controllers that are actually connectable but currently unsupported for special reasons. Therefore, if a customer requests that such an unsupported but connectable external storage controller be connected to the storage controller temporarily or permanently, the information for that external storage controller has to be added to the support information. This support information updating work has also required enormous labor.

Furthermore, for conventional storage controllers to which external storage controllers can be connected as externally-connected devices, the storage controller and the external storage controllers are connected using two or more data paths (cables) in order to provide redundancy. In this case, examples of a path control system include three types: an active-active system; a hot standby system; and a cold standby system. The active-active system is a multi-path system, in which, available paths including an alternate path are used in a balanced manner. The hot standby system is a single path system, in which, one path is used on a priority basis and only when this path is busy, is the other path used. The cold standby system is another single path system, in which, only one path is used and when this path cannot be used due to defects or similar, is the other path used. Which path control system an external storage controller adopts depends on the type.

However, in the case of a storage controller having the conventional external connection functions, a uniform path control system is adopted for the connected external storage controllers, regardless of the path control system types adopted by the connected external storage controllers. Therefore, there is a problem that sufficient input/output performance cannot be achieved, owing to, for example, the path control systems of the connected external storage controllers.

Moreover, with a storage controller having the conventional external connection functions, a uniform timeout time for data input/output is set for the connected external storage controllers. This timeout time is set to be short, so as to be compatible with any new model storage controller, so that the responsiveness of the storage system can be enhanced. Accordingly, when an old-type storage controller requiring a long response time is connected to a current storage controller, timeout occurs frequently.

The present invention was made considering the above points and its first object is to propose a storage controller capable of user-friendly information display; and a controlling method for the same. Its second object is to simplify updating of the support information. A third object of the present invention is to execute appropriate path-control for each external storage controller connected to the storage controller, thereby having the external storage controller to provide sufficient input/output performance. Moreover, its fourth object is to expand the range of objects that can be supported by effectively preventing the occurrence of timeouts, even in external storage controllers requiring a long response time.

In order to achieve the above objects, the present invention provides a storage controller to which predetermined external storage controllers can be connected as externally-connected devices. The storage controller includes: a transmit/receive unit for transmitting a predetermined inquiry command to a connected external storage controller and receiving inquiry data transmitted from the external storage controller in response to the inquiry command; and a code extract/convert unit for extracting, from the inquiry data, a first code indicating a vendor name and/or a device name of the external storage controller and converting the extracted first code into a second code indicating a real vendor name and/or a real device name of the external storage controller. Because the second code is displayed, an operator can immediately recognize the vendor name and the device name of the external storage controller connected to the storage controller.

In one aspect of the present invention, the storage controller includes: a storage unit for storing a database in which, for each connectable external storage controller, a position of the first code in the inquiry data transmitted from the external storage controller and the second code are associated and stored. In this storage controller, the code extract/convert unit detects, by referring to the database, the position of the first code in the inquiry data transmitted from the external storage controller, extracts the first code from the inquiry data on the basis of the detection result, and converts the extracted first code into the second code by referring to the database.

Moreover, according to the first embodiment of the present invention, in a more preferable embodiment thereof, the database stores path control system adopted for the respective connectable external storage controllers, and, based on the inquiry data transmitted from the connected external storage controller, the transmit/receive unit detects, by referring to the database, a path control system adopted for the external storage controller, and sets the detected path control system as the path control system for data input/output between the external storage controller and the storage controller. With this configuration, it is possible to employ an appropriate path control system for each external storage controller.

Moreover, the present invention provides the storage controller to which predetermined external storage controllers can be connected as externally-connected devices. The storage includes: a transmit/receive unit for transmitting a predetermined inquiry command to a connected external storage controller and receiving inquiry data transmitted from the external storage controller in response to the inquiry command; a storage unit for storing a database in which, for each connectable external storage controller, a position of a first code in the inquiry data transmitted from the external storage controller, the first code indicating a vendor name and/or a device name arbitrarily determined by the manufacturer thereof, and a second code indicating a real vendor name and/or a real device name of the external storage controller are associated and stored; and a code extract/convert unit for detecting, by referring to the database, the position of the first code in the inquiry data transmitted from the external storage controller and extracting the first code from the inquiry data on the basis of the detection result, and converting the extracted first code into the second code by referring to the database. In this storage controller, the database stores a third code indicating that a connected external storage controller cannot be connected as an externally-connected device. The third code is commonly used in place of the second code for external storage controllers that cannot be connected as externally-connected devices. The code extract/convert unit outputs the third code as a conversion result when a transmitter of the inquiry data is not a connectable external storage controller. Because the third code is displayed, the operator can immediately and clearly recognize that the external storage controller is not an external controller that can be connected to the storage controller.

Furthermore, the present invention provides a storage controller having a plurality of model kinds and to which predetermined external storage controllers can be connected as externally-connected devices. The storage controller includes: a storage unit for storing second support information that compiles first information of each model regarding whether or not it can be connected to the respective connectable external storage controllers. With this configuration, it is possible to update the support information (first support information) of the respective models in one operation.

The present invention also provides a storage controller to which predetermined external storage controllers can be connected as externally-connected devices. The storage controller includes: a storage unit for storing a database that stores timeout threshold values previously set for the connectable external storage controllers; and a transmit/receive unit for transmitting a predetermined inquiry command to a connected external storage controller and receiving inquiry data transmitted from the external storage controller in response to the inquiry command. In this storage controller, based on the inquiry data transmitted from the connected external storage controller, the transmit/receive unit detects, by referring to the database, a timeout threshold value set for the external storage controller and sets the detected timeout threshold value as the timeout time for data input/output between the external storage controller and the storage controller. Accordingly, it is possible to set an appropriate timeout time for each external storage controller.

The present invention further provides a controlling method for a storage controller to which predetermined external storage controllers can be connected as externally-connected devices. This controlling method includes: (a) transmitting a predetermined inquiry command to the external storage controller connected to the storage controller and receiving inquiry data transmitted from the external storage controller to the storage controller in response to the inquiry command; and (b) extracting, from the inquiry data, a first code indicating a vendor name and/or a device name of the external storage controller and converting the extracted first code into a second code indicating a real vendor name and/or a real device name of the external storage controller. Because the second code is displayed, the operator can immediately recognize the vendor name and the device name of the external storage controllers connected to the storage controller.

In another aspect of the invention, in a more preferable embodiment thereof, the storage controller stores a database in which, for each external storage controller that can be connected to the storage controller, a position of the first code in the inquiry data transmitted from the external storage controller and a second code are associated and stored. In the extracting and converting step (b), the storage controller detects, by referring to the database, the position of the first code in the inquiry data transmitted from the external storage controller, extracts the first code from the inquiry data on the basis of the detection result, and converts the extracted first code into the second code by referring to the database.

Moreover, in this aspect of the present invention, in a more preferable embodiment thereof, the database stores path control systems adopted to the respective external storage controllers, the external storage controllers capable of being connected to the storage controller. In the extracting and converting step (b), based on the inquiry data transmitted from the connected external storage controller to the storage controller, a path control system adopted for the external storage controller is detected by referring to the database, and the detected path control system is set as the path control system for data input/output between the external storage controller and the storage controller. Accordingly, it is possible to employ an appropriate path control method for each external storage controller.

The present invention further provides a controlling method of a storage controller to which predetermined external storage controllers can be connected as externally-connected devices. In this method, the storage controller includes a storage unit for storing a database in which, for each connectable external storage controller, a position of a first code in the inquiry data transmitted from the external storage controllers, the first code indicating a vendor name and/or a device name arbitrarily determined by the manufacturer thereof, and a second code indicating a real vendor name and/or a real device name of the external storage controller are associated and stored. The controlling method includes: (a) transmitting a predetermined inquiry command to a connected external storage controller and receiving inquiry data transmitted from the external storage controller in response to the inquiry command; and (b) detecting the position of the first code in the received inquiry data by referring to the database, extracting the first code from the inquiry data on the basis of the detection result, and converting the extracted first code into the second code by referring to the database. The database stores a third code indicating that a connected external storage controller cannot be connected as an externally-connected device, the third code being commonly used in place of the second code for external storage controllers that cannot be connected as externally-connected devices. In the extracting and converting step (b), when the sender of the inquiry data is not a connectable external storage controller, the storage controller outputs the third code as the conversion result. Because the third code is displayed, the operator can immediately and clearly recognize that the external storage controller is not an external controller that can be connected to the storage controller.

Moreover, the present invention provides a controlling method of a storage controller to which predetermined external storage controllers can be connected as externally-connected devices. In this method, the storage controller stores a database for storing timeout threshold values previously set for the respective connectable external storage controllers. The controlling method includes: (a) transmitting a predetermined inquiry command to a connected external storage controller; (b) detecting, based on inquiry data transmitted from the external storage controller in response to the inquiry command, the timeout threshold value set for the external storage controller by referring to the database; and (c) setting the detected timeout threshold value as the timeout time for data input/output between the external storage controller and the storage controller. Accordingly, it is possible to set an appropriate timeout time for each external storage controller.

The present invention allows the operator to recognize the vendor names and the device names of the external storage controllers immediately, thereby having a user-friendly information display. Moreover, it is possible to update the support information of the respective models in one operation, thereby simplifying updating of the support information. Furthermore, it is possible to employ an appropriate path control system for each external storage controller, thereby causing the external storage controllers to provide sufficient input/output performance. Yet, because an appropriate timeout time can be set for each external storage controller, it is possible to effectively prevent the occurrence of timeouts, even in the external storage controllers requiring a long response time, thereby expanding the range of objects that can be supported.

BRIEF DESCRIPTION OF THE DRAWINGS

FIG. 7 is a conceptual diagram showing a profile information table.

FIG. 8 is a conceptual diagram illustrating a "chassis's support/non-support information" field in the profile information table.

FIG. 11 is a plan view showing display content, such as a vendor name etc., of a second storage controller, on a display of a host system.

DETAILED DESCRIPTION OF THE INVENTION

An embodiment of this invention is described below in detail, with reference to the attached drawings.

Figure 1:
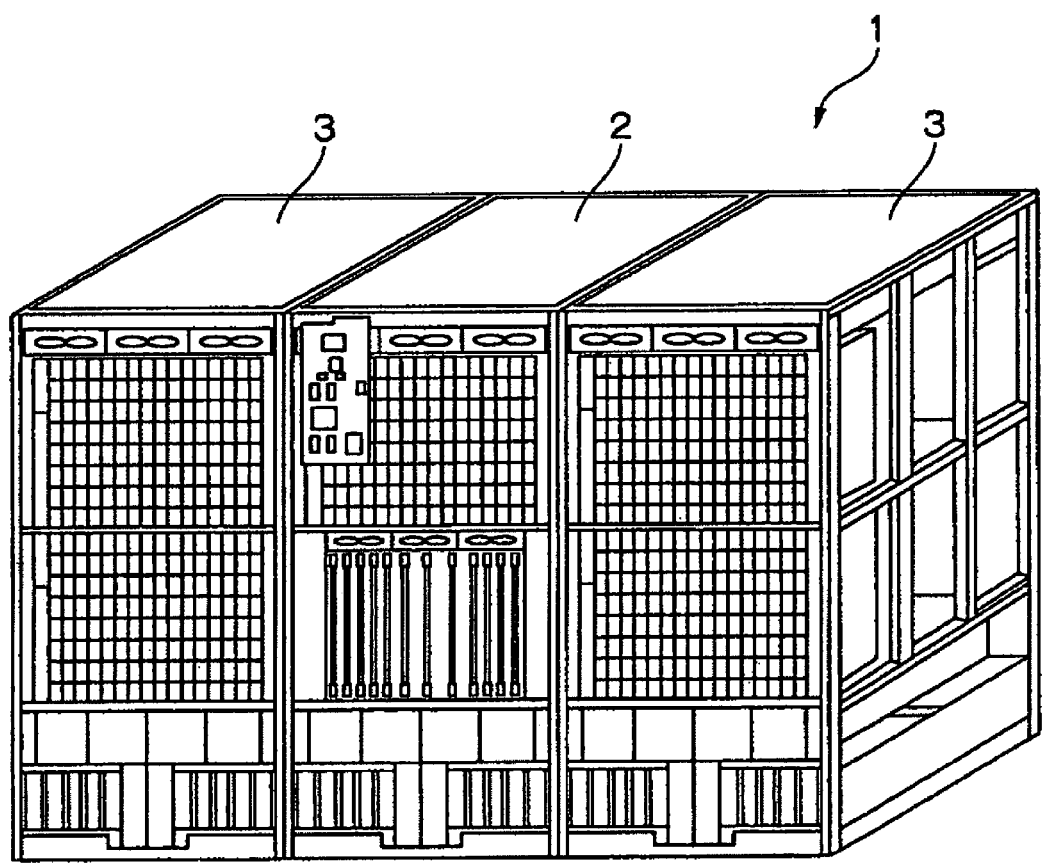
FIG. 1 is a perspective view showing an external structure of a storage controller according to one embodiment of the present invention.

(1) External Configuration of Storage Controller According to this Embodiment FIGS. 1 to 4 show external configurations of a storage controller 1 according to this embodiment. As shown in FIG. 1, the storage controller 1 is composed of a controller 2 and drivers 3.

Figure 2:
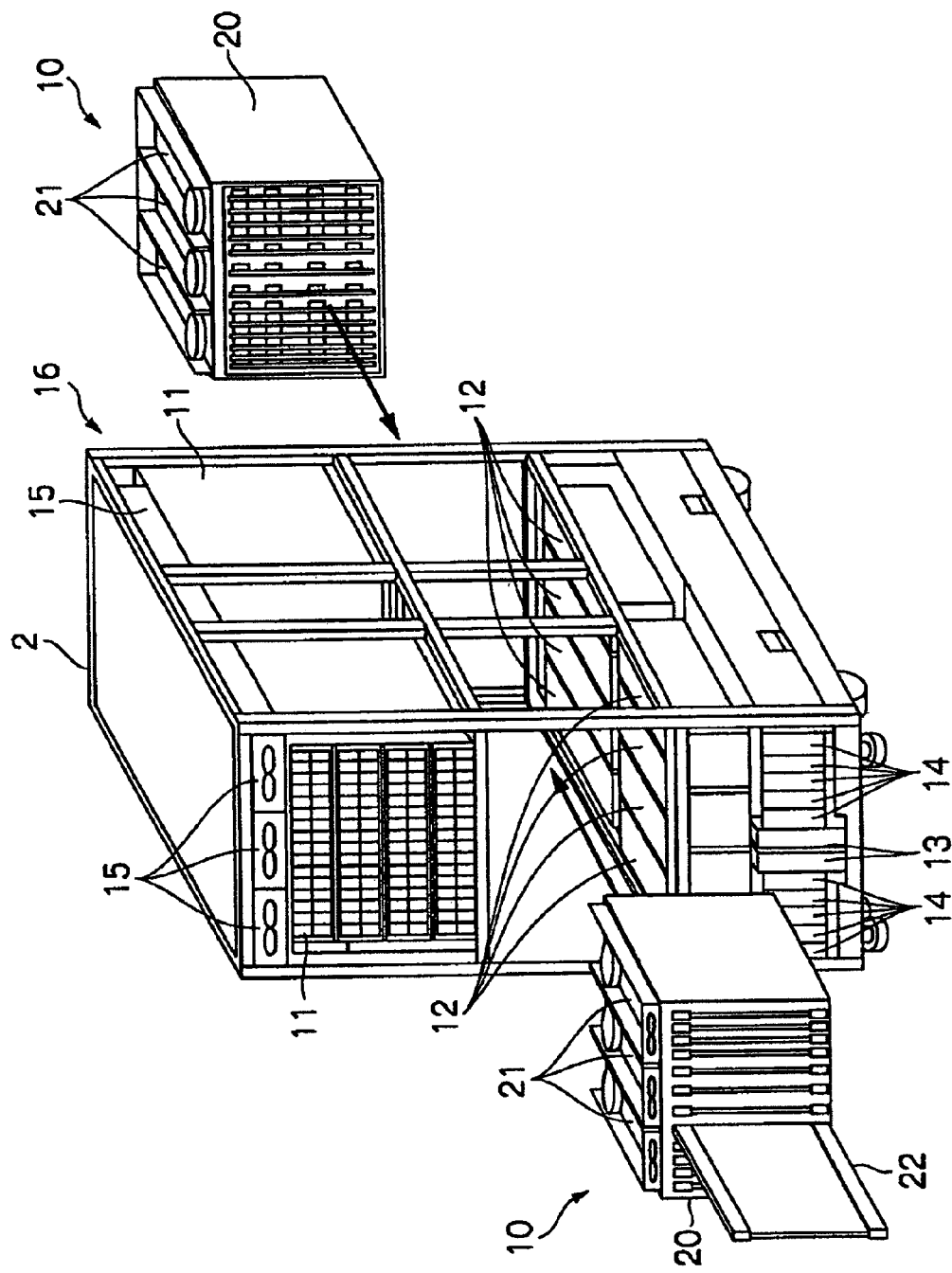
FIG. 2 is an exploded perspective view illustrating an external structure of a controller.
Figure 3:
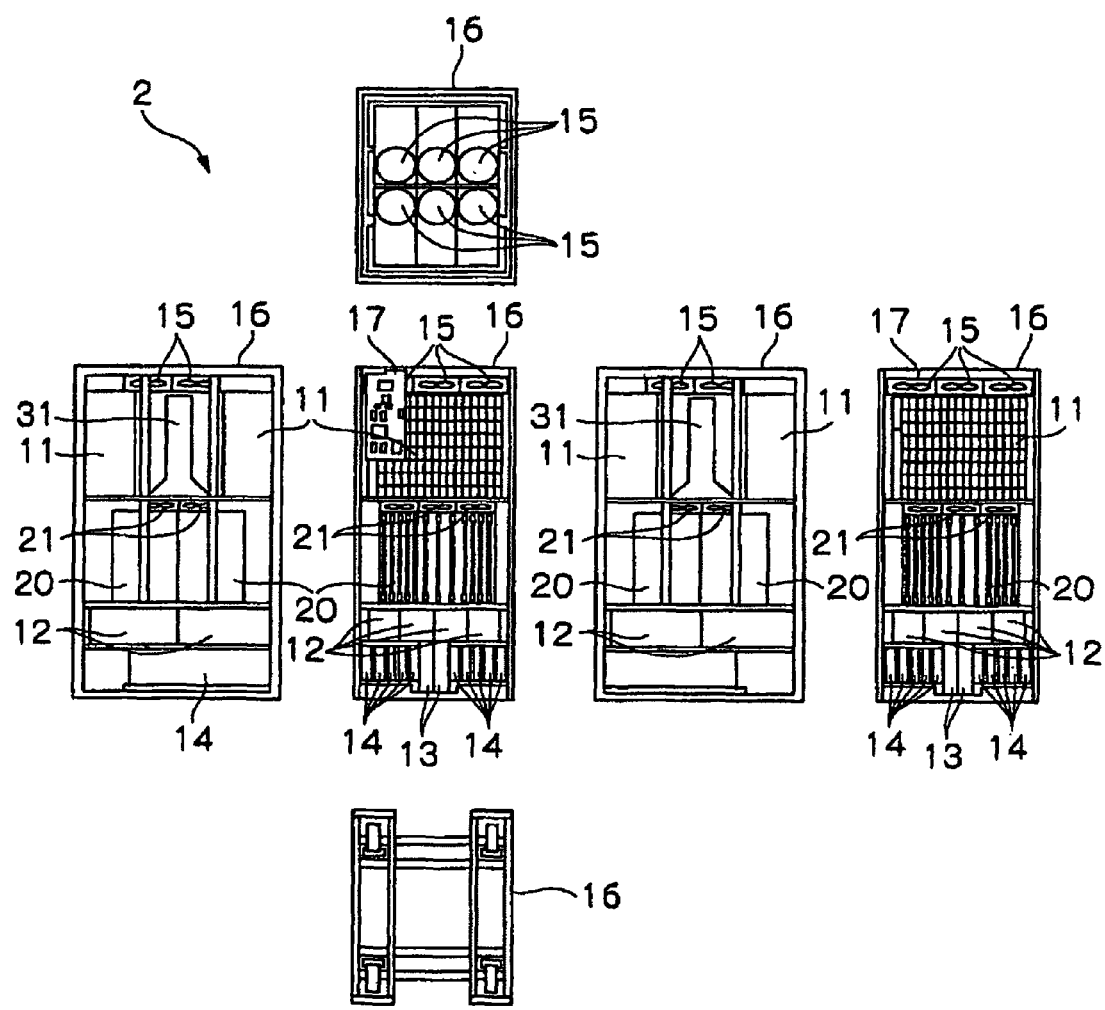
FIG. 3 is a hexahedral view illustrating the external structure of the controller.

As shown in FIGS. 2 and 3, the controller 2 is composed of logical modules 10, disk drive modules 11, DC power sources 12, AC-BOXes 13, batteries 14, and fans 15, all being housed in a chassis 16. Although it is omitted in FIG. 2, the controller 2 is equipped with an operator panel 17 (FIG. 3) for receiving operation input made by an operator who performs maintenance and management of the storage controller 1.

As is clear from FIG. 2, each logical module 10 includes logical units 20 for controlling the entire storage controller 1; and logical module fans 21, both being housed in the chassis 16 in a detachable manner. In each logical unit 20, logical boards control boards for executing controls relating to data input/output processing to disk drives) 22 are aligned and housed in a detachable manner, for executing various controls of the storage controller 1.

Examples of the logical boards 22 housed in each logical unit 20 include a channel adapter for executing communication for data input/output with an information processor (hereinafter called the "host system") that employs the storage controller 1 as a storage apparatus a disk adapter for executing the input/output processing of data stored in the disk drives 30, and a cache memory for storing data transmitted between the storage controller 1 and the host system.

The logical module fans 21 are for draining air from inside the logical units 20 to the outside to cool down the inside of the logical units 20.

The disk drive modules 11 are housed in the chassis 16 in a detachable manner and house the disk drives 30 for storing data. The disk drives 30 are devices for storing data and have memory media inside. Various devices can be used as the disk drives 30, including hard disk devices and semiconductor memory device, for example.

The fans 15 drain air from inside the controller 2 to the outside, thereby expelling the heat generated at the disk drive modules 11 and the logical modules 10 outside the controller 2. As shown in FIG. 3, the controller 2 contains air ducts 31 within the chassis 16 for draining air from inside the logical modules 10 housed on the middle level in the chassis 16 to outside the controller 2.

At the bottom of the chassis 16, the DC power sources 12 constituting a power source unit, the AC-BOXes 13, and the batteries 14 are housed in a detachable manner. Each DC power source 12 includes a power source device for converting alternating current power into direct current power and supplying the direct current power to the logical modules 10 and the disk drives 30. The logical modules 10 and the disk drives 30 are operated by direct current power of different voltages, however, in this embodiment, direct current power of a uniform rated voltage is supplied to both the logical modules 10 and the disk drives 30 from the DC power sources 12. The logical modules 10 and the disk drives 30, that are provided with that same voltage power, convert the power to their own voltages using their own voltage converters (DC/DC converters) respectively housed in the logical modules 10 and the disk drives 30.

The batteries 14 are spare power source devices for supplying power to each component in the controller 2 in blackout situations or under abnormal conditions of the DC power sources 12. The AC-BOXes 13 are inlets for the alternating current power into the storage controller 1 and function as breakers. The alternating current power taken into the AC-BOXes 13 is supplied to the DC power sources 12.

Figure 4:
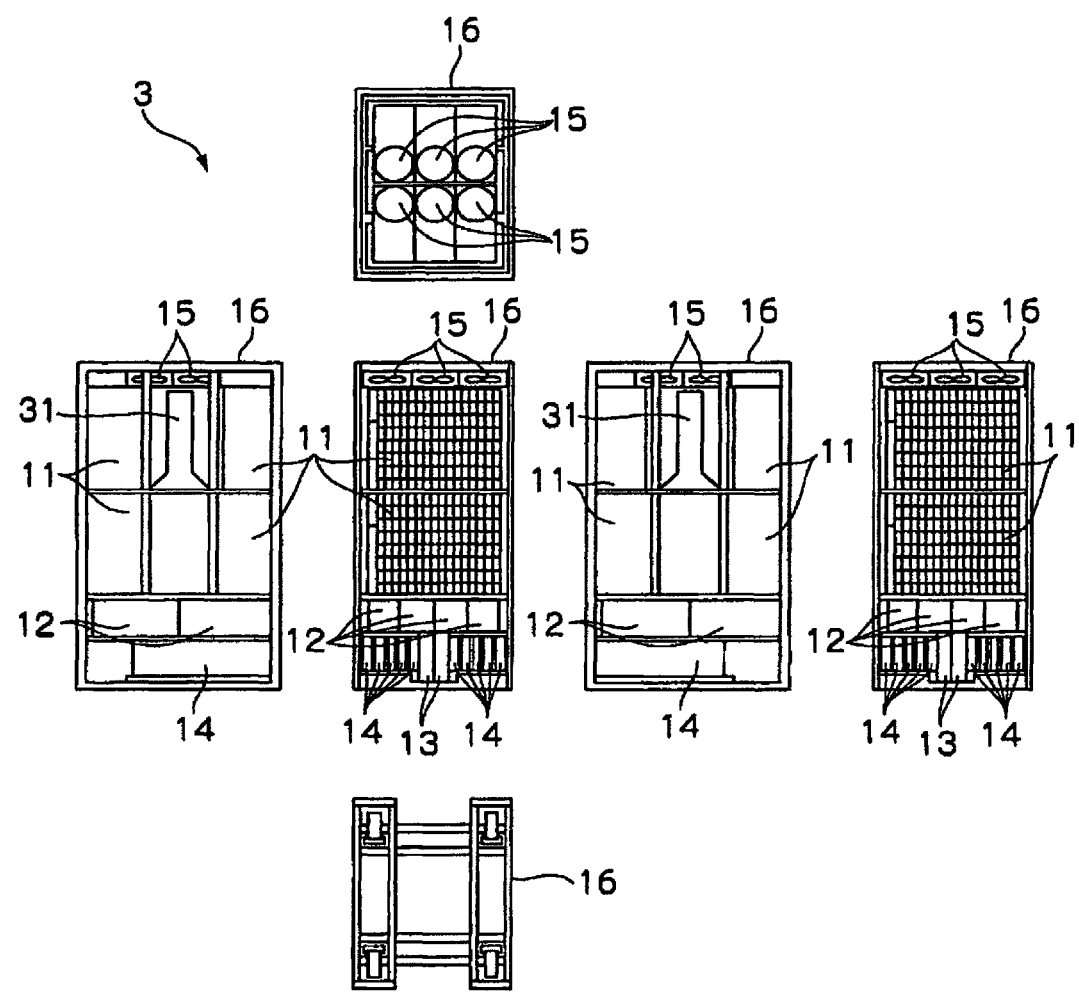
FIG. 4 is a hexahedral view illustrating an external structure of a driver.

Each driver 3 is composed of disk drive modules 11, DC power sources 12, AC-BOXes 13, batteries 14, and fans 15, all being housed in a chassis 16, as shown in FIG. 4. These modules and other components are the same as those used in the controller 2. In the storage controller 1 according to this embodiment, both the controller 2 and the drivers 3 are structured using a same chassis 16. In each driver 3, disk drive modules 11 are housed on the middle level of the chassis 16, the same place the logical modules 10 are housed in the controller 2.

The fans 16 draw air inside the disk drive modules 11 arranged on the top and middle levels of the chassis 16, and drain air to outside the drivers 3. Therefore, the heat generated by the disk drives 30 housed in the disk drive modules 11 can be expelled outside the drivers 3. Incidentally, each driver 3 contains air ducts 31 within the chassis 16 for draining air from inside the disk drive modules 11 housed on the middle level in the chassis 16 to outside the driver 3 using the fans 15.

Figure 5:
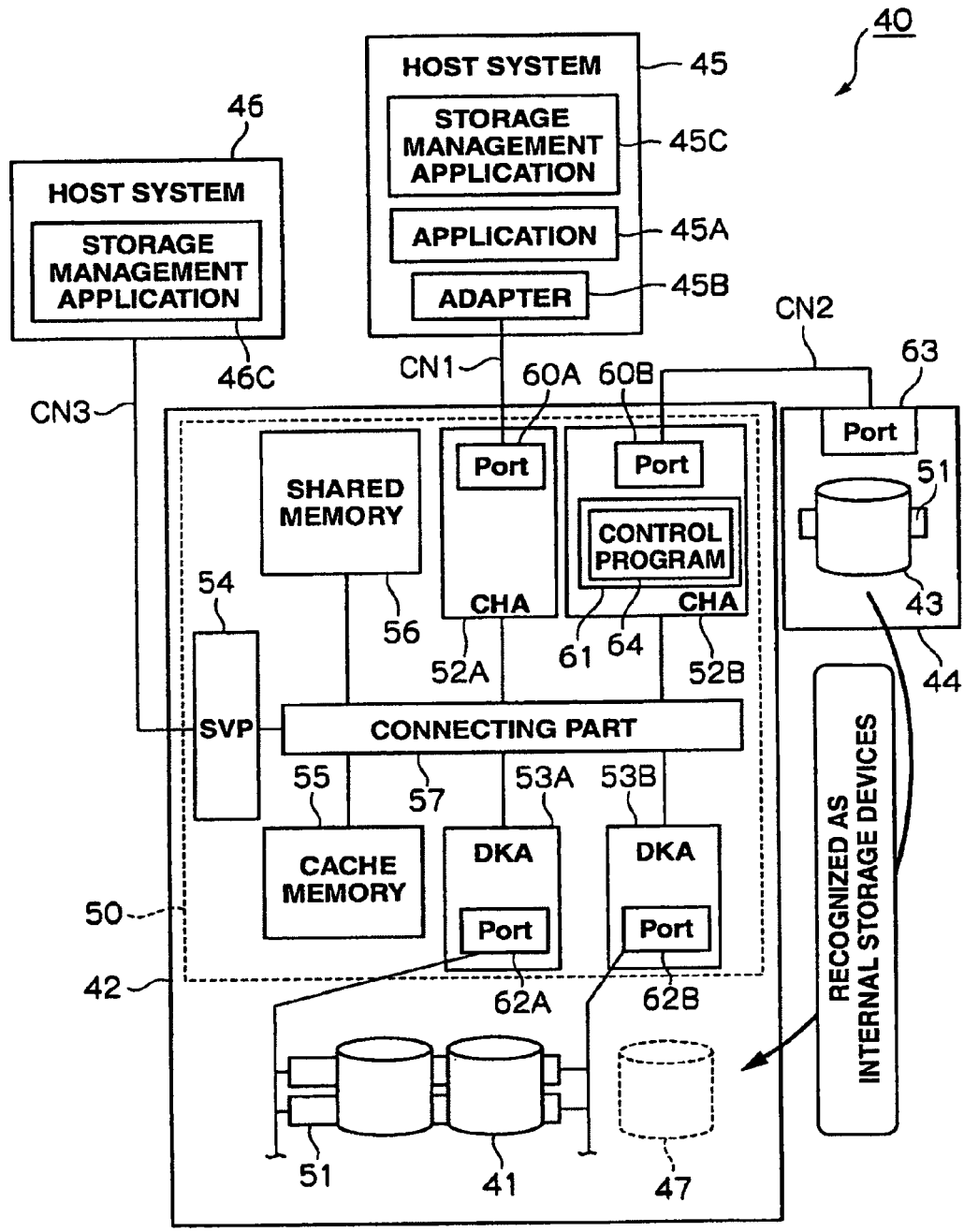
FIG. 5 is a block diagram showing a configuration of a storage system according to the embodiment with a dotted line.

(2) Internal Configuration of Storage Controller According to this Embodiment (2-1) Configuration of Storage System According to this Embodiment FIG. 5 shows a configuration of a storage system 40 according to this embodiment. This storage system 40 has the same external configuration as the storage controller 1 described in relation to FIGS. 1 to 4, and is composed of a first storage controller 42 having one or more logical storage devices (hereinafter called "LDEVs") 41; and a second storage controller 44 having one or more LDEVs 43.

The first storage controller 42 is connected to a host system 45 via a first communication network CN1; the second storage controller 44 via a second communication network CN2; and another host system 46 via a third communication network CN3.

The host system 45 is a computer device that includes information processing resources such as a Central Processing Unit (CPU) and memory, and is composed of, for example, a personal computer, a workstation, or a mainframe etc. The host system 45 also includes: information input devices (not shown in the drawing), such as a keyboard switch, a pointing device, and/or a microphone; and information output devices (not show in the drawing), such as a monitor display and/or speakers. The host system 45 also includes: an application program 45A such as database software that uses storage areas provided by the first storage controller 42; and an adapter 45B for accessing the first storage controller 1 via the first communication network CN1.

The host system 45 also includes a storage management application 45C. This storage management application 45C is a computer program operated by being read by the CPU (not shown in the drawing) and it sends commands (control data) to the first storage controller 42 and controls the operation of the first storage controller 42. Specifically, for example, the storage management application 45C selects, from among the plural LDEVs 41 managed by the first storage controller 42, one LDEV 41 (or 47) from which data is copied, and another LDEV 41 (or 47) to which the data is copied, and has the first storage controller 42 execute the data copy.

The host system 45 is capable of data input/output with the first storage controller 42 via the first communication network CN1. Examples of the first communication network CN1 include a LAN, a SAN, the Internet, private line(s), or public line(s), any of which can be used as necessary. Data communications via a LAN are conducted according to, for example, Transmission Control Protocol/Internet Protocol (TCP/IP). When the host system 45 is connected to the first storage controller 42 via a LAN, the host system 45 designates a file name and requests data input/output in files. On the other hand, when the host system 45 is connected to the first storage controller 42 via a SAN, the host system 45 requests, according to a fiber channel protocol, data input/output in blocks, which is a data management unit for storage areas provided by plural disk drives. When the first communication network CN1 is a LAN, the adapter 45B is, for example, a network card compatible with the LAN. When the communication network CN1 is a SAN, the adapter 45B is, for example, a host bus adapter. It is also possible to transmit/receive the control data of the storage management application 45C via the first communication network CN1.

Incidentally, the host system 45 may be connected to the second storage controller 44 via the second communication network CN2. The host system 46 connected to the first storage controller 42 via the third communication network CN3 may have the same configuration as the above-described host system 45. The second communication network CN2 and the third communication network CN3 may be configured by, for example, a SAN, a LAN, the Internet, private line(s), or public line(s). The host system 46 is capable of transmitting control data for controlling the first storage controller 42 to the first storage controller 42 via the third communication network CN3.

The first storage controller 42 is configured, for example, as a disk array sub-system. However, without limitations to the above, the first storage controller 42 may be configured as a high-performance, intelligent-type fiber channel switch. The same thing can be said for the second storage controller 44.

The first storage controller 42 includes a controller 50 and a plurality of disk drives 51. The controller 50 includes: a plurality of (two, for example) channel adapters 52A and 52B; a plurality of disk adapters 53A and 53B; a service processor 54; a cache memory 55; a shared memory 56; and a connecting part 57.

Each of the channel adapters 52A and 52B functions as a transmit/receive unit for transmitting/receiving data and various commands and the like to/from the external devices connected to the first storage controller 1 (for example, the host system 45 or the second storage controller 44). The channel adapters 52A and 52B includes communication ports 60A and 60B. In this embodiment, the channel adapter 52A is connected to the host system 45 via the communication port 60A and the first communication network CN1, and the channel adapter 52B is connected to the second storage controller 44 via the communication port 60B and the second communication network CN2.

Each of the channel adapters 52A and 52B is configured as a microcomputer system that includes a microprocessor (MP) 61 and memory and such, and it interprets and executes various commands received from the external devices. The respective channel adapters 52A and 52B are given their own network addresses (for example, an Internet Protocol (IP) address or a World Wide Name (WWN)) to identify themselves. In this situation, the channel adapters 52A and 52B are each capable of behaving as a Network Attached Storage (NAS). Moreover, the channel adapters 52A and 52B may operate according to a control program operated by being read by the microprocessor. This control program executes, for example, timeout-control processing and path-control processing, which will be described later.

The disk adapters 53A and 53B perform data transmission with the disk drives 51. The disk adapters 53A and 53B have a communication port 62A and a communication port 62B respectively for connection to the disk drives 51. Each of the disk adapters 53A and 53B is configured as a microcomputer system that includes a CPU and memory. Each of the disk adapters 53A and 53B writes data to the disk drives 51 (more precisely, disks in the disk drives 51) or reads data from the disk drives 51, according to commands from the channel adapters 52A and 52B. When executing data input/output with the disk drives 51, the respective disk adapters 53A and 53B convert a logical address to a physical address. If the disk drives 51 are managed according to a RAID configuration, the respective disk adapters 53A and 53B execute data access according to the RAID configuration.

The service processor 54 is a computer device operated for maintaining or managing the first storage controller 42 and is composed of, for example, a laptop personal computer. This service processor 54 is connected to the host system 46 via the third communication network CN3 and is capable of receiving data or commands from the host system 46. The service processor 54 is also capable of monitoring the occurrence of difficulties in the first storage controller 42, displaying it on a display (not shown in the drawing), and, based on a command from the host system 46, requesting closing processing etc. of the disk drives 51, which are physical storage devices configuring the LDEVs 41.

The cache memory 55 is for temporarily storing data received from the host system 45 or read from the LDEVs 41. The shared memory 56 stores control information for controlling the operation of the first storage controller 42 and information indicating the associations of the respective LDEVs 41 with the respective disk drives 51. In the shared memory 56, work areas are set and various control information such as a profile information table, which will be described later, is stored. Incidentally, the LDEVs 41 may be used as cache disks.

The connecting part 57 connects the channel adapters 52A and 52B, the disk adapters 53A and 53B, the service processor 54, the cache memory 55 and the shared memory 56 to one another. The connecting part 57 may be configured as a high-speed bus, such as an ultrahigh-speed crossbar switch, that performs data transmission by a high-speed switching operation. The connecting part 57 may be configured with a communication network such as the LAN or the SAN, or a plurality of networks together with the aforementioned high-speed bus.

Examples of the disk drives 51 include hard disks, flexible disks, magnetic tapes, semiconductor memory device, optical disks, and other devices. One or more LDEVs 41 are prepared by one or more disk drives 51. Incidentally, in the following description, the LDEVs 41 provided by the first storage controller 42 are called "internal LDEVs 41" and the LDEVs 43 provided by the second storage controller 44 are called "external LDEVs 43," for ease of explanation.

The reference numeral 47 indicated with a dotted line in FIG. 5 shows virtual internal LDEVs provided to the host system 45 (or 46). In other words, the reference numeral 47 indicates a state where the external LDEVs 43 of the second storage controller 44 are virtually incorporated into the first storage controller 42. In short, in this embodiment, the LDEVs 43 recognized as existing outside by the first storage controller 42, are provided to the host system 45 (or 46) as the internal LDEVs 47 of the first storage controller 42. In other words, because the first storage controller 42 can provide, to the host system 45, the LDEVs 43 of the second storage controller 44 as its own LDEVs 47, it need not have its own local LDEVs 41 (that is, the disk drives 51 for configuring the LDEVs 41) that it directly controls. Consequently, even when the first storage controller 42 has no LDEVs 41, it can provide storage resources to the host system 45.

The second storage controller 44 may have the same configuration as the first storage controller 42. For example, the second storage controller 44 includes a communication port 63 and LDEVs 43. In addition, it may include channel adapters and disk adapters etc. The second storage controller 44 is connected to the first storage controller 42 via the second communication network CN2 and the external LDEVs 43 are designed to be dealt with as the internal LDEVs 47 of the first storage controller 42.

Figure 6:
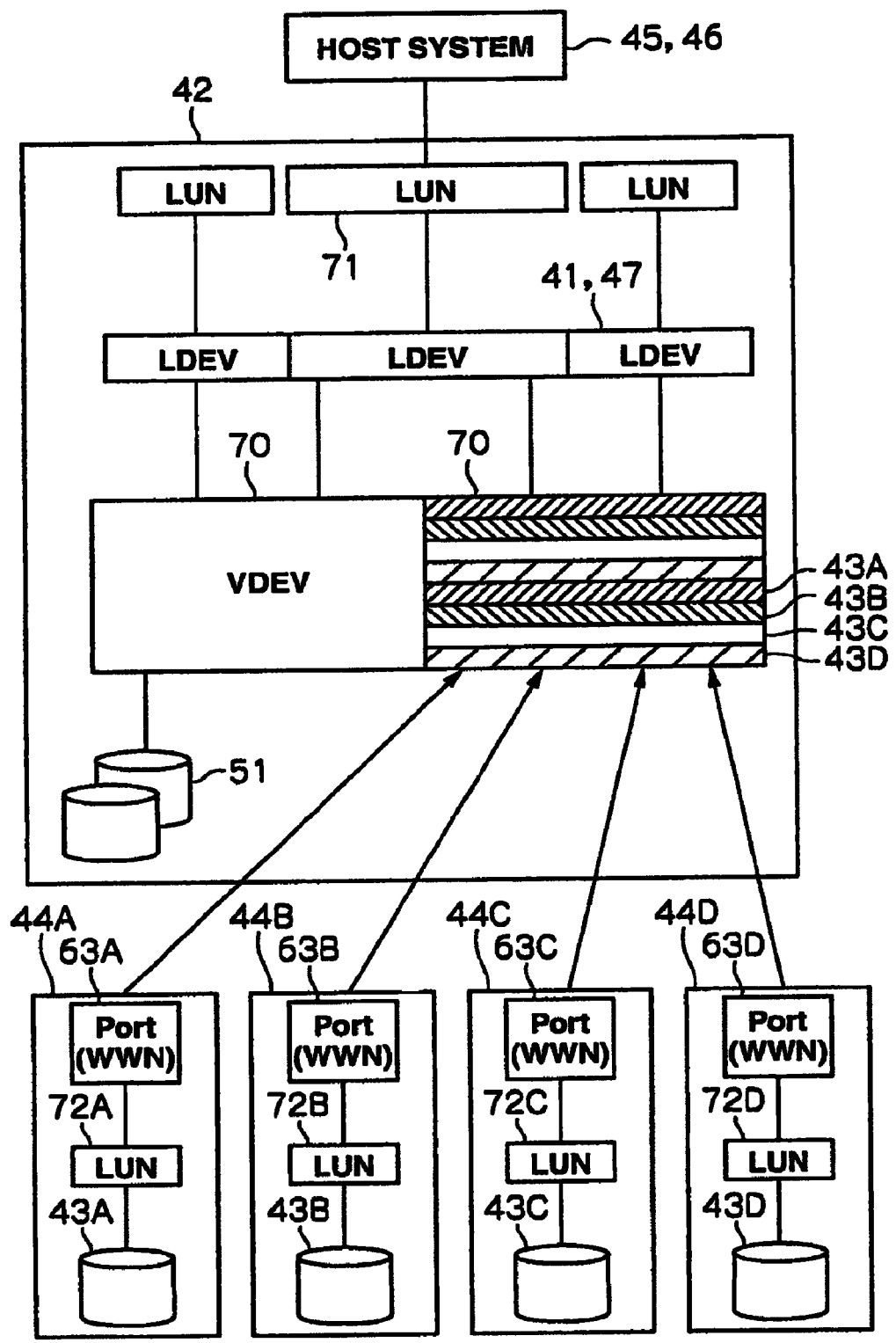
FIG. 6 is a block diagram illustrating virtualization of LDEVs provided by a second storage controller.

FIG. 6 shows an outline of the mechanism where the LDEVs 43 of the second storage controller 44 are provided to the host system 45 as the internal LDEVs 47 of the first storage controller 42.

The first storage controller 42 has a three-tier storage hierarchy that is composed of, in order from the bottom, VDEVs 70, LDEVs 41 and LUNs 71.

The VDEVs 70 are virtual devices positioned at the bottom of the logical storage hierarchy. The VDEVs 70 are virtualized physical storage resources and a RAID configuration may be adopted therefor. In other words, it is possible to form a plurality of VDEVs 70 with one disk drive 51 (slicing) and it is also possible to form one VDEV 70 with a plurality of disk drives 51 (strapping). The VDEV 70 shown at the left side in FIG. 6 virtualizes the disk drives 51 according to the predetermined RAID configuration.

The VDEV 70 shown at the right side in FIG. 6 is configured by mapping the LDEVs 43 of the second storage controller 44 (in other words, the disk drives 51 that provide the LDEVs 43). Specifically, in this embodiment, the LDEVs 43 provided by the disk drives 51 of the second storage controller 44 can be used as the internal LDEVs 47 of the first storage controller 42 by mapping the LDEVs 43 to the VDEV 70. In the example shown in the FIG. 6, four second storage controllers 44 (44A to 44D) are provided and the second storage controllers respectively have: communication ports 63 (63A to 63D) that are each given WWNs—unique identification information; Logical Unit Numbers (LUNs) 72A to 72D; and LDEVs 43 (43A to 43D). Each LDEV 43 (43A to 43D) may be identified by the combination of the WWN and LUN (and possibly an ID of the second storage controller, for example).

Above the VDEVs 70, the LDEVs 41 and 47 are provided. It is possible to connect one VDEV 70 to one or more LDEVs 41 (and/or 47), and it is also possible to connect a plurality of VDEVs 70 to one LDEV 41 (or 47). The host system 45 is capable of accessing the LDEVs 41 and/or 47 via a predetermined or preferred LUN 71.

Thus, in this embodiment, because the external LDEVs 43 are connected to an intermediate storage tier (VDEVs 70, LDEVs 47) positioned between the LUNs 71 and the external LDEVs 43, it is possible to use the external LDEVs 43 as some of the internal LDEVs 47 of the first storage controller 42. Specifically, for example, when the first storage controller 42 receives at its channel adapter 52A an I/O request (a write command or read command) to an internal LDEV 47 from the host system 45, the first storage controller 42 causes the channel adapter 52B to access, via the VDEV 70, the external LDEV 43 associated with the internal LDEV 47.

(2-2) Profile Information Table

In order for the first storage controller 42 to provide, to the host system 45 (or 46), the LDEVs 43 of a second storage controller 44 as its own LDEVs 47, the second storage controller 45 has to be an object to be supported by the first storage controller. That is, the second storage controller 44 has to be a storage controller that can be connected to the first storage controller 42 as an externally-connected device. An inquiry command is used to check whether or not the second storage controller 44 is such object to be supported.

The inquiry command is used for specifying the type or the configuration of the external storage controller inquired, and, under the protocol according to the Small Computer System Interface (SCSI), for example, it may be an inquiry command subject to the SCSI protocol. The first storage controller 42 transmits an inquiry command to the second storage controller 44 and receives inquiry data from the second storage controller 44. The inquiry data is composed of a vendor name (manufacturer's name), a device name, and a scan number of the second storage controller 44, and an operator can recognize the vendor name etc. of the second storage controller 44, based on this inquiry data.

However, the inquiry data format differs depending on the manufactures and the models of the external storage controllers. Therefore, unless the first storage controller 42 is given prior information regarding where, in the inquiry data transmitted from the second storage controller 44, the information of the vendor name and device name and so on are stored, the first storage controller 42 will not be able to recognize the vendor name and so on of the second storage controller 44 from the inquiry data.

So, the first storage controller 42 previously stores, in its shared memory 56 (FIG. 5), a profile information table 80 as shown in FIG. 7, which is a database storing the vendor names, device names and other various information of the external storage controllers to be supported.

As is clear from FIG. 7, the profile information table 80 according to this embodiment has fields 80A to 80F of "vendor name," "device name," "chassis's support/non-support information," "device identifier effective flag," "alternate path model," and "timeout threshold value" for the respective external storage controllers to be supported.

The "vendor name" field 80A is composed of "page," "byte position" "number of bytes," "content," and "screen display" sections. The "page," "byte position," and "number of bytes" sections respectively show, for each of the external storage controllers, the inquiry data page number on which its "vendor name" is indicated, and the byte position and data length of the "vendor name" in the inquiry data. Accordingly, in the example of FIG. 7, for example, in the case of an external storage controller with the product name of "AAA," title of "○○○," and developing code of "aaa", its vendor name is indicated on the page "0x00" of its inquiry data, at the byte position of "0x08," and for the data length of "0x08". Incidentally, in FIG. 7, the symbol "←" in a box indicates that a content to be indicated in the box is the same as that indicated in the left box. The same can be said for the following description.

The "content" section of the "vendor name" field 80A indicates, for each of the external storage controllers, how its vendor name is indicated in the inquiry data. Accordingly, in the former example of the external storage controller with the product name of "AAA," title of "○○○," and developing code of "aaa," its vendor name is indicated as "HATA" in its inquiry data. The "screen display" section shows, for each of the external storage controllers, how its vendor name indicated in its inquiry data is going to be displayed on the screen. This will be described later.

The "device name" field 80B is composed of "page," "byte position" "number of bytes," "content," and "screen display" sections. Just as in the case of the "vendor name" field 80A, the "page," "byte position," and "number of bytes" sections respectively show, for each of the external storage controllers, the inquiry data page number on which its "vendor name" is indicated, and the byte position and data length of the "vendor name" in the inquiry data. The "content" section indicates, for each of the external storage controllers, how its device name is indicated in its inquiry data. The "screen display" section, for each of the external storage controllers, indicates how its vendor name indicated in its inquiry data is going to be displayed on the screen. This will also be described later.

A "scan number" field 80C is composed of "page," "byte position," "number of bytes," and "ASCII" sections. Among these sections, the "page," "byte position," and "number of bytes" sections are the same as those in the "vendor name" field 80A and the "device name" field 80B, therefore, their explanations are omitted. The "ASCII" section shows whether a scan number of an external storage controller is indicated in ASCII code or binary code.

On the other hand, a "chassis's support/non-support information" field 80D indicates, for the external storage controllers in the respective columns bitmapped support information that compiles support information of each model of the first storage controller 42. In the example of FIG. 7, the codes [0] to [3] respectively represent the models "AAA," "BBB," "CCC," and "DDD" of the first storage controller 42. Accordingly, the "chassis's support/non-support information" field 80D indicates, in the bitmap format, whether or not each of the four models of the first storage controller 42 supports the external storage controllers in the respective columns.

Each of the numeric values such as "0xe0," "0xa0," and "0x00" at the right-hand side of the codes [0] to [3] indicates, as numeric values of eight bits expressed in binary numbers, numerals written in the respective columns for each model ([0] to [3]) in the bitmap as shown in FIG. 8. Accordingly, "0xe0" represents "11100000," "0xa0" represents "10100000," and "0x00" represents "00000000."

Of the eight bits, the bit 0 indicates whether or not the relevant model supports the external storage controller in the relevant column, that is, whether or not the external storage controller can be connected to the model (device support valid/invalid). The bit 1 indicates whether or not the model supports ordinary data input/output with the external storage controller, that is, whether or not the model can execute ordinary data input/output with the external storage controller. The bit 2 indicates whether or not the model supports a high-copy function for the external storage controller, that is, whether or not the model can copy data stored by the external storage controller to its own LDEV(s) 41 (FIG. 5). In the boxes corresponding to bit 0 to the bit 2, "1" indicating "support" or "0" indicating "non-support" is entered. The bit 3 and subsequent bits are reserved and [0] is entered to the corresponding boxes.

Accordingly, a model with the numeric value "0xe0" indicated at its right-hand side supports both ordinary input/output and the high-copy function for an external storage controller of a relevant column. A model with the numeric value "0xa0" indicated at its right-hand side supports the high-copy function but not ordinary input/output for an external storage controller of a relevant column. In the example shown in FIG. 7, the model "AAA" represented by the code [0] supports both ordinary input/output and the high-copy function when a connected external storage controller is one having any one of the product names "AAA" to "FFF." However, model "AAA" supports only the high-copy function for external storage controllers having the product names of "GGG" and "HHH." A model with the numeric value "0x00" indicated at its right-hand side supports neither the ordinary input/output or the high-copy function for an external storage controller in a relevant column.

As described above, in this embodiment, the support information of the respective models is compiled and shared, therefore, unlike conventional storage controllers, it is unnecessary to create support information for each model; moreover, update of the support information of the respective models can be conducted easily. Furthermore, because "support" or "non-support" is shown with flags in the compiled support information, when an unsupported external storage controller is connected to the first storage controller 42, it is only necessary to change the flag of the external storage controller (from [0] to [1]) so that it becomes an object to be supported. Accordingly, if profile information of any manufacturer's external storage controllers that are currently unsupported but expected to become objects to be supported in the future, is added to the profile information table 80 in advance, even when the channel adapters 52A and 52B of the first storage controller 42 are upgraded and the number of types of supportable external storage controllers increases, the profile information table need not be updated in its entirety, instead it is only necessary to change the flags in the support information to make the external storage controllers be the objects to be supported.

In the "alternate path model" field 80E in the profile information table 80, the path control systems adopted for the external storage controllers in the respective columns are indicated. For example, [0] is stored for an external storage controller that employs, as its path control system, the aforementioned active-active system in which available paths including the alternate path are used in a balanced manner. [1] is stored for an external storage controller that employs the hot standby system, in which, one path is used on a priority basis and the other path is used only when this path is busy. [2] is stored for an external storage controller that employs the cold standby system, in which, only one path is used and the other path is used when this path cannot be used for disturbances etc. In the example shown in FIG. 7, it can be seen that the external storage controller with the product name of "AAA" and title of "○○○" employs the active-active system as its path control system; the external storage controller with the product name of "BBB" or "CCC" and title of "Δ○Δ" employs the hot standby system; and the external storage controller with the product name of "EEE" and title of "○□○" employs the cold standby system.

The "timeout threshold value" field 80F indicates, for the external storage controllers in the respective columns, respective timeout threshold values (timeout time) previously set. In the example of FIG. 7, for the external storage controller with the product name of "GGG" and title of "☐☐☐," the timeout time is set to "20" seconds, while for the external storage controller with the product name of "HHH" and title of "Δ☐x," the timeout time is set to "30" seconds. For the rest of the external storage controllers, their timeout times are set to "15" seconds.

(2-3) Various Functions Incorporated in First Storage Controller according to this Embodiment Next, various functions of the first storage controller 42 will be explained.

(2-3-1) Code Conversion Function

The storage controller 42 according to this embodiment has a code conversion function for converting a coded vendor name and a coded device name of the second storage controller 44, obtained from the inquiry data transmitted from the second storage controller 44 in response to an inquiry command, into real name codes (character strings) and transmitting them to the host system 46. This function is realized through the processing executed by the service processor 54 (FIG. 5) of the first storage controller 42, based on the control program incorporated therein.

Figure 9:
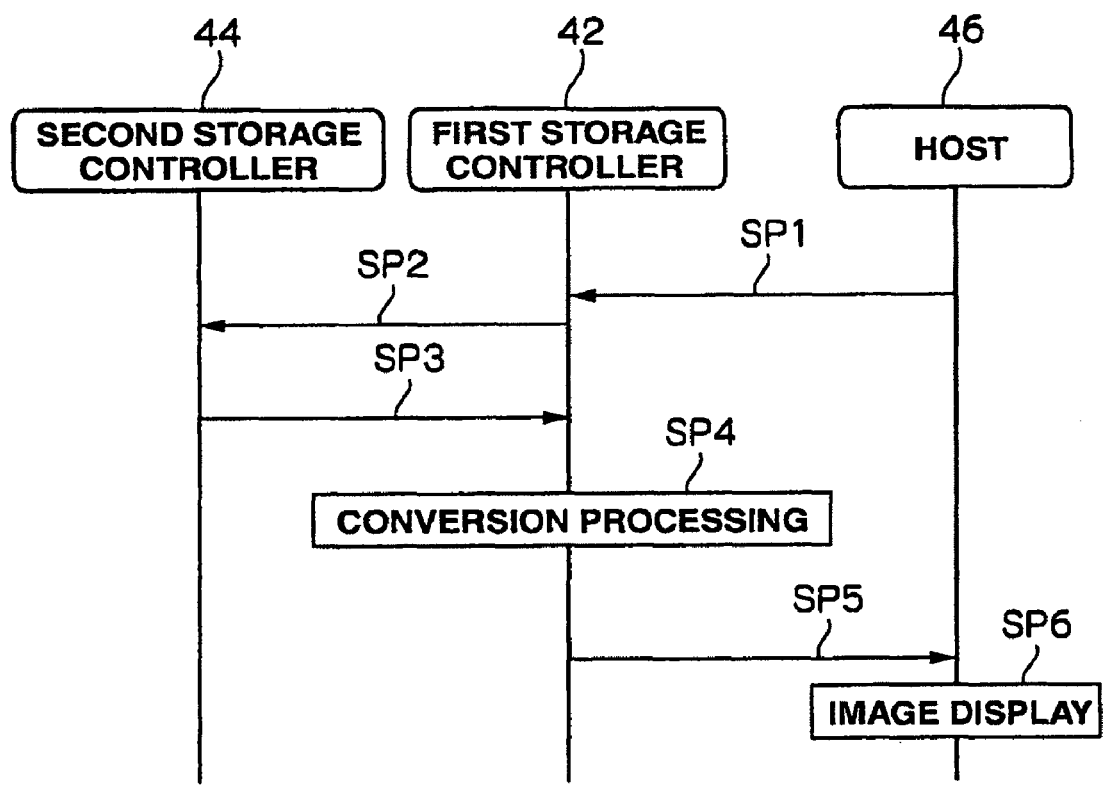
FIG. 9 is a timing chart illustrating a code conversion function.

Practically, as shown in FIG. 9, when a command for searching an external storage controller connected to the first controller 42 is inputted by the operator, the host system 46 transmits a so-called discovery command for detecting an external storage controller connected to the first storage controller 42 (SP1) to the first storage controller 42.

In the first storage controller 42, the service processor 54 receives the discovery command from the host system 46. When the service processor 54 receives the discovery command, it controls the relevant channel adapter 52B via the connecting part 57, thereby transmitting an inquiry command to the second storage controller 44, which is an external storage controller connected to the first storage controller 42 (SP2).

When the service processor 54 receives inquiry data transmitted from the second storage controller 44 in response to the inquiry command via the channel adapter 52B and the connecting part 57 in sequence (SP3), it extracts, from the inquiry data, the respective codes for the vendor name and the device name of the second storage controller 44 and converts, with reference to the profile table 80 stored in the shared memory 56, these codes into codes (character strings) indicating the real vendor name and the real device name of the second storage controller 44 (SP4).

Figure 10:
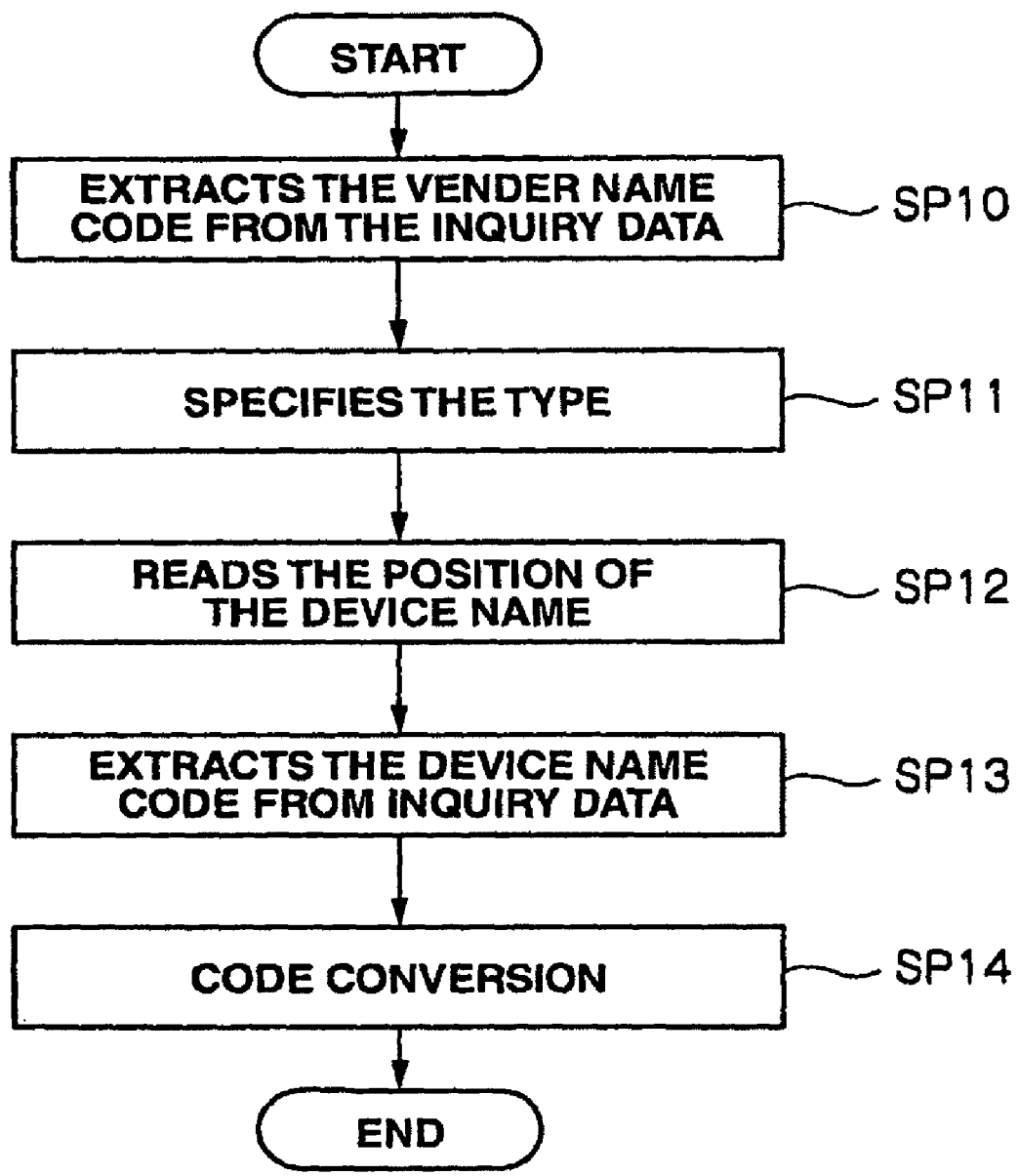
FIG. 10 is a flow chart showing a processing procedure executed by a service processor relating to the code conversion function.

Specifically, according to the processing procedure shown in FIG. 10, the service processor 54 extracts the code for the vendor name from the received inquiry data (SP10) and specifies the type of the second storage controller 44 on the basis of the extracted code for the vendor name and the codes listed in the "content" sections, in the "vendor name" field 80A (FIG. 7) of the profile information table 80, for the respective external storage controllers to be supported (SP11). Then, the service processor 54 reads, with reference to the "page," "byte position," and "number of byte" sections of the predetermined type in the "device name" field 80B (FIG. 7), a position in the inquiry data where the device name of that type is indicated (SP12). Then, based on this readout result, the service processor 54 extracts the code for the device name of the second storage controller 44 from the inquiry data (SP13).

Then, the service processor 54 checks whether or not the thus-obtained code for the device name matches the code indicated in the relevant box of the "content" section in the "device name" field 80B in the profile information table 80, and reads the code indicated in the relevant box of the "screen display" section in the "vendor name" field 80A, and the code indicated in the relevant box of the "screen display" section in the "device name" field 80B. Then, the service processor 54 converts the codes for the vendor name and the device name in the inquiry data into the codes for the vendor name and the device name read out from the profile information table 80 respectively (SP14).

Referring back to FIG. 9, the service processor 54 then transmits, to the host system 46 as inquiry result data, predetermined information such as: the real name codes (character strings) of the vendor name and the device name of the second storage controller 44 obtained through the aforementioned conversion processing; the codes for the scan number of the second storage controller 44 included in the inquiry data; and the WWN of the communication port 60B (FIG. 5) of the channel adapter 52B (FIG. 5), which is controlled by the first storage controller 42 itself and connected to the second storage controller 44 (SP5).

Thus, based on the inquiry result data, the host system 46 displays, at predetermined positions in a window 81 as shown in FIG. 11, a WWN, the scan number, the device name, and the vendor name and the like of the external storage controller (the second storage controller 44) connected to the first storage controller 42 (SP6).

In this case, regarding the first storage controller 42, because the respective codes for the vendor name and the device name of the second storage controller 44 are converted into the codes (character strings) indicating the real vendor name and the real device name of the second storage controller 44 in the inquiry result data transmitted from the first storage controller 42 to the host system 46, and because the host system 46 displays the vendor name and the device name of the second storage controller 44 based on the inquiry result data, the operator can without fail recognize the displayed vendor name and the device name of the second storage controller 44 immediately.

Incidentally, in case any external storage controller that is not an object to be supported is connected to the first storage controller 42, the profile information table 80 stores various profile information (the column with "OTHER" entered in the box for a developing code), which is shared by all external storage controllers that are not to be supported. When the service processor 54 of the first storage controller 42 specifies the type of the second storage controller 44 on the basis of the inquiry data transmitted from the second storage controller 44 (SP11 in FIG. 10), and if it cannot specify the type of the second storage controller 44 for reasons such as the second storage controller 44 is not an object to be supported, it reads the code ("OTHER") indicated in the "screen display" section of the "vendor name" field 80A of the column with "OTHER" entered in the box for a developing code; and the code ("OTHER") indicated in the "screen display" section of the "device name" field 80B of the same column (SP12 in FIG. 10), and transmits them to the host system 46 as the conversion result (SP5 in FIG. 9). Accordingly, at this time, the host system 46 displays, on its display, the character strings "OTHER" in the vendor name field and the device name field of the second storage controller 44 (SP6 in FIG. 9). Thereby, the operator can without fail recognize immediately that the second storage controller 44 connected to the first storage controller 42 is not an object to be supported by the first storage controller 42 (that is, the second storage controller 44 cannot be connected to the first storage controller 42 as an externally-connected device).

However, when the type of the second storage controller 44 cannot be specified, it is possible to set the first storage controller 42 so that the codes "OTHER" will not be transmitted to the host system 46 as the codes for the vendor name and the device name of the second storage controller 44. In this situation, the service processor 54 does not indicate anything at address positions in the inquiry result data where the codes for the vendor name and the device name of the second storage controller 44 should be indicated (all [0]). Accordingly, at this time, the host system 46 does not display anything, on its display, at the part in the window 81 of FIG. 11 where the vendor name and the device name should be displayed.

In the case where the type of the second storage controller 44 cannot be specified, as above, the first storage controller 42 cannot provide LDEVs of the second storage controller 44 to the host systems 45 and 46 as its own LDEVs 47. With this configuration, it is possible to avoid the risks caused by providing LDEVs of unidentified external storage controllers to the host systems 45 and 46.

As described, regarding the storage system 40 (FIG. 5) according to this embodiment, the first storage controller 42 is previously provided with the profile information table 80 that associates the codes for the vendor names and the device names contained in the inquiry data transmitted from the respective connected external storage controllers to be supported, with the codes for the real vendor names and the device names of the external storage controllers, and the first storage controller 42 converts, using the profile information table 80, the codes for the vendor name and the device name obtained from the inquiry data transmitted from the second storage controller 44 into the real name codes that the operator of the host system 46 can immediately recognize. Therefore, even if the vendor name and the device name in the inquiry data transmitted from the second storage controller 44 are indicated with codes unknown to the public, such as developing codes, the vendor name and the device name familiar to the operator as he/she has seen in catalogs or similar can be displayed as such on the display of the host system 46, thereby enabling the provision of a user-friendly information display interface.

(2-3-2) Path-Control-System Switching Function

Figure 12:
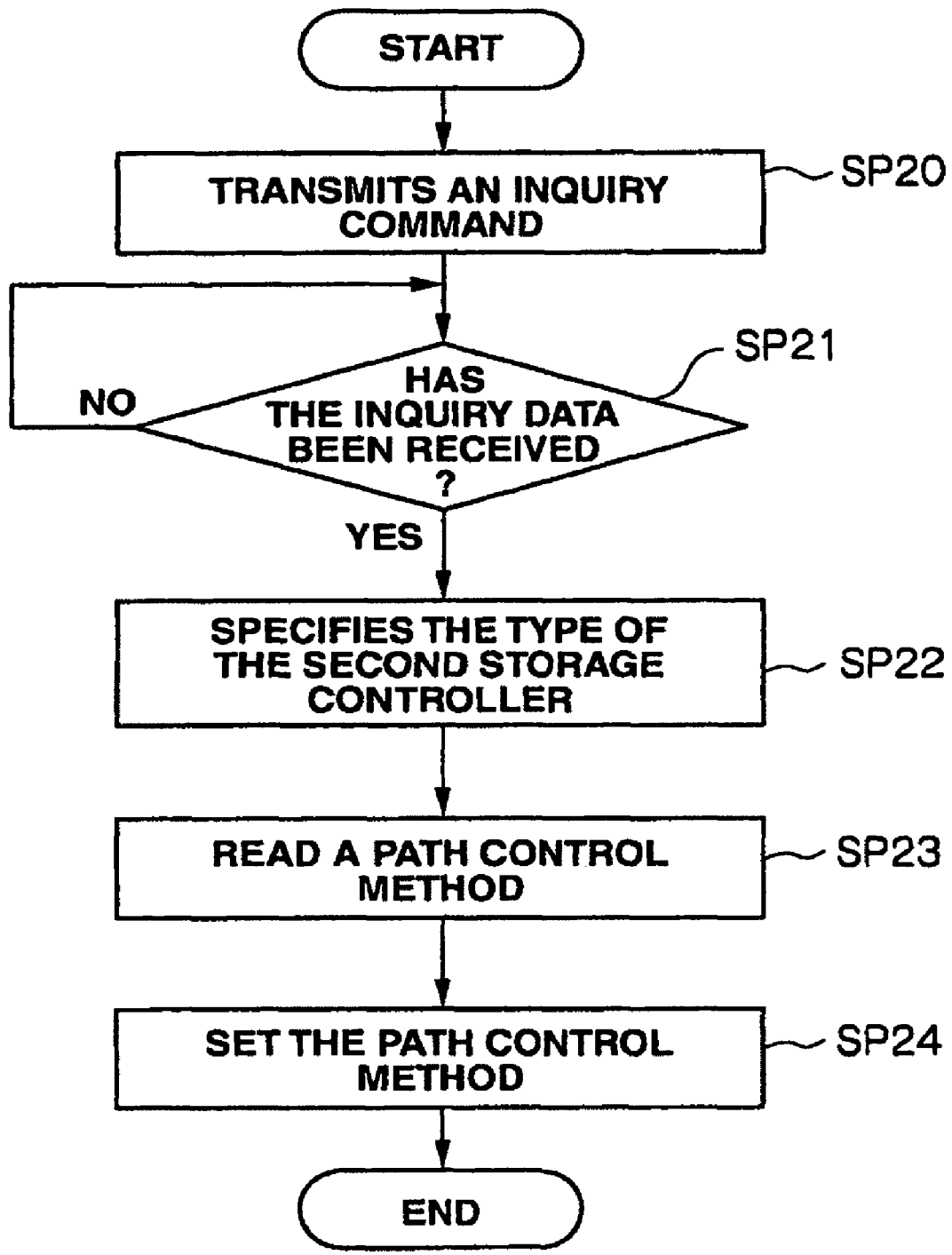
FIG. 12 is a flow chart showing a processing procedure executed by a channel adapter relating to a path-control-system switching function.
Figure 13:
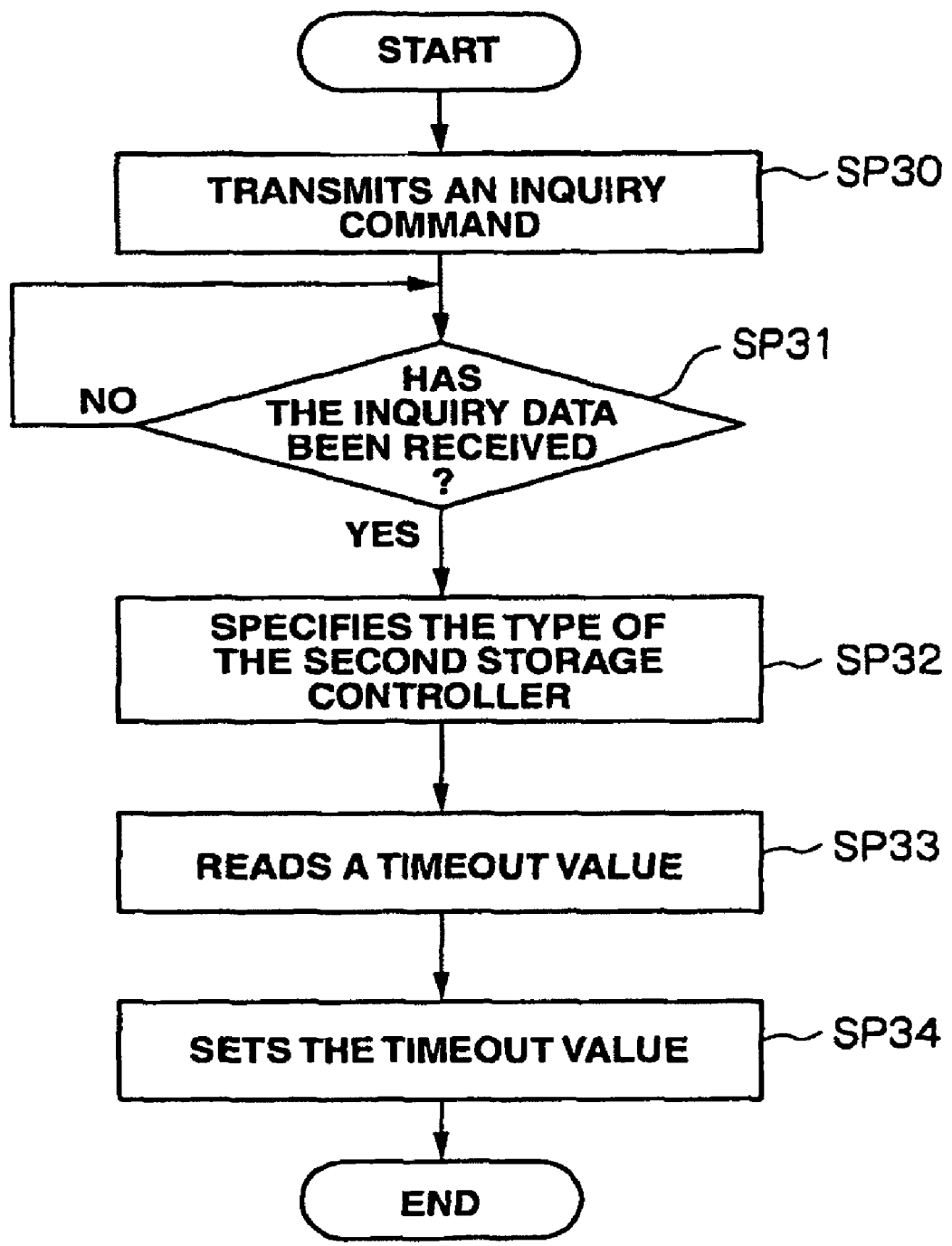
FIG. 13 is a flow chart showing a processing procedure executed by a channel adapter relating to a timeout-time switching function.

The first storage controller 42 has a path-control-system switching function, by which, a path control system is switched from one to another according to the types of the external storage controllers (for example, a second storage controllers 44) connected to the first storage controllers so that each of the external storage controllers can employ its own path control system. This function is realized through the execution of the processing procedure, shown in FIG. 12, by the relevant channel adapter 52B, on the basis of the control program 64 previously stored in the memory of the respective channel adapters 52A and 52B of the first storage controller 42.

Specifically, the channel adapter 52B transmits an inquiry command to an external storage controller (hereinafter, described as the "second storage controller 44") at the time when the second storage controller 44 is first connected to the communication port 60B (FIG. 5) (SP20).

When the channel adapter 52B receives inquiry data transmitted from the second storage controller 44 in response to the inquiry command (SP21:Y), it then specifies the type of the second storage controller 44 (SP22) based on the inquiry data and the profile information table 80 stored in the shared memory 56 (FIG. 5), in the same manner as described in Steps SP10 and SP11 in FIG. 10, and, based on this specification result, reads a numeric value indicated in the relevant box in the "alternate path model" field 80E in the profile information table 80 (SP23).

If the numeric value read out is [0], the channel adapter 52B sets the aforementioned active-active system as the path control system for data input/output with the second storage controller 44, while if the numeric value is [1], it sets the hot standby system as the path control system for the same, and if the numeric value is [2], it sets the cold standby system as the path control system for the same (SP24).

Then, the channel adapter 52B executes data input/output with the second storage controller 44 using the path control system set as above.

With the storage system 40 (FIG. 5) according to this embodiment, the first storage controller 42 detects, using the profile information table 80, the path control system adopted for the second storage controller 44 and selects, on the basis of the detection result, the detected path control system as the path control system for the second storage controller 44. Accordingly, it is possible to execute appropriate path control according to the type of the second storage controller 44. Consequently, in the case where the active-active system is employed as the path control system for the second storage controller 44, load-balanced data transfer can be executed and sufficient data input/output performance can be ensured.

(2-3-3) Timeout-Time Switching Function

The first storage controller 42 has a timeout-time switching function, by which a timeout time is switched from one to another according to the types of external storage controllers. This function is realized through the execution of the processing procedure, shown in FIG. 12, by the relevant channel adapter 52B on the basis of the control program 64 previously stored in the memory of the respective channel adapters 52A and 52B of the first storage controller 42.

Specifically, the channel adapter 52B transmits an inquiry command to an external storage controller (hereinafter, described as the second storage controller 44) (SP30) at the time when the second storage controller 44 is first connected to the communication port 60B (FIG. 5). Then, it specifies the type of the second storage controller 44 (SP31 and SP32) in the same manner as in the case of the path-control-system switching function (SP21 and SP22) explained with reference to FIG. 12.

Subsequently, based on the specification result, the channel adapter 52B reads a numeric value indicated in the relevant box in the "timeout threshold value" field 80F in the profile information table 80 (SP33), and sets the numeric value read as the timeout time for the second storage controller 44 (SP34).

Figure 14:
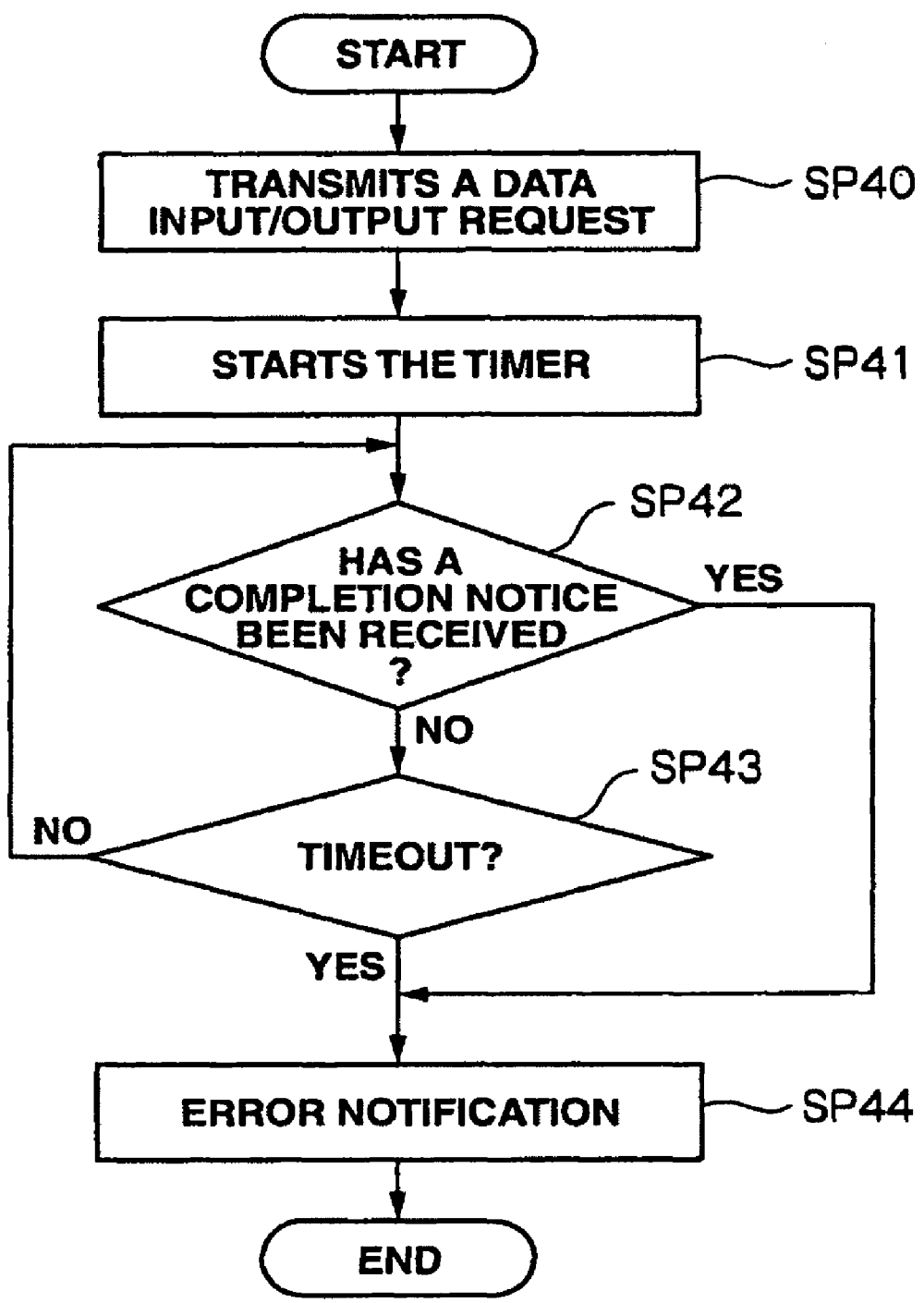
FIG. 14 is a flow chart showing a processing procedure execyted by a channel adapter relating to a timeout-time switching function.

FIG. 14 shows the processing procedure executed by the channel adapter 52B in relation to the timeout control based on the timeout time set as above. When the host system 45 gives a request for data input/output with the second storage controller 44 to the channel adapter 52B, the channel adapter 52B transfers the request to the second storage controller 44 (SP40) and starts an internal timer not shown in the drawing (SP41).

Then, the channel adapter 52B repeatedly checks whether or not it has received a completion notice, which is sent from the second storage controller 44 when the data input/output processing as a response to the data input/output request has been completed, and whether or not the timeout time has elapsed according to the count on the internal timer (SP42 and SP43).

If the channel adapter 52B receives a completion notice from the second storage controller 44 before the time runs out, it completes the processing. On the other hand, if the time runs out before the channel adapter 52B receives such notice from the second storage controller 44, it transmits an error notice to the host system 45 (SP44), and then terminates the processing.

As described, in the storage system 40 (FIG. 5) according to this embodiment, an appropriate timeout time is set according to the type of the second storage controller 44. Accordingly, for an external storage controller requiring a long response time, the timeout threshold value is set high, while, for an external storage controller requiring a short response time, the timeout threshold time is set low. Thereby, even when an old type of external storage controller requiring a long response time is connected to the first storage controller 42 as a second storage controller 44, the frequent occurrence of timeouts can be effectively prevented. Consequently, even external storage controllers requiring a long response time can be supported as objects connected to the first storage controller 42, thereby, further expanding the range of the external storage controllers as the objects to be supported, and enhancing versatility. With external storage controllers requiring a short response time, discovery (detection) and data input/output processing can be executed in a short time.

(3) Other Embodiments

In the description of the aforementioned embodiment, the present invention has been explained in relation to the case where it is applied to the first storage controller 42 having the aforementioned configuration shown in FIG. 5. However, the present invention is not limited to that case and can be applied to various storage controllers having various other configurations.

Moreover, the aforementioned embodiment has been explained for the case where, in the first storage controller 42, the service processor 54 is used as a code extract/convert unit for extracting, from the inquiry data transmitted from the second storage controller 44, the codes indicating the vendor name and the device name of the second storage controller 44, and converting the extracted codes into the codes indicating the real vendor name and the real device name of the second storage controller 44. However, the present invention is not limited to the above. That function of the code extract/convert unit may be provided by the channel adapters 52A and 52B or it is possible to provide a dedicated processor to the first storage controller 42 for performing that function.

Furthermore, the aforementioned embodiment has been explained for the case where the first storage controller 42 converts the codes for both the vendor name and the device name extracted from the inquiry data that is transmitted from the second storage controller 44, into the codes indicating the real vendor name and the real device name of the second storage controller 22. However, the present invention is not limited to such case. It is possible to set things so that either of the vendor name or the device is converted according to the display form of the host systems 45, 46.

The present invention can be widely applied to storage controllers to which external storage controllers can be connected as externally-connected devices.

What is claimed is:

1. A storage system, which is coupled to a host computer and a plurality of external storage systems including an external storage device storing data sent from the host computer via the storage system, the storage system comprising:
   a plurality of internal storage devices storing data sent from the host computer;
   a controller being configured to manage a first logical unit provided with the plurality of internal storage devices and a second logical unit provided with the plurality of external storage devices in the external storage system; and
   a memory storing profile information indicating a relation between a path control method and a model of an external storage system,
   wherein the controller is configured to send an inquiry command to each of the external storage systems, receive inquiry data including information regarding a model of each of the external storage systems from each of the external storage systems, detect a model of each of the external storage systems by referring to the received inquiry data, and set path control methods which are used to transfer data to each of the external storage systems based on the detected model of each of the external storage systems and the profile information.

2. A storage system according to claim 1, wherein the control path methods include an active-active method in which a plurality of paths to an external storage system are used to transfer data to the external storage system.

3. A storage system according to claim 1, wherein the control path methods include a hot standby method in which a first path to an external storage system is used to transfer data to the external storage system and a second path to an external storage system is only used when the first path is busy.

4. A storage system according to claim 1, wherein the control path methods include a cold standby method in which a first path to an external storage system is used to transfer data to the external storage system and a second path to an external storage system is only used when failure has occurred on the first path.

5. A storage system according to claim 1, wherein the profile information further indicates a relation between a time out threshold and a model of an external storage system, and
   wherein the controller is configured to set a time out threshold to each of the external storage systems based on the detected model of each of the external storage systems and the profile information.

6. A storage system according to claim 5, wherein the controller is configured to send an input/output request to each of the external storage systems, and send an error notice to the host computer in the case that the time out threshold for each of the external storage systems is exceeded before receiving a response to the input/output request from each of the external storage systems.

7. A method in a storage system, which is coupled to a host computer and a plurality of external storage systems including an external storage device storing data sent from the host computer via the storage system, a plurality of internal storage devices storing data sent from the host computer, a controller and memory, said method comprising:
   managing a first logical unit provided with the plurality of internal storage devices and a second logical unit provided with the plurality of external storage devices in the external storage system;
   storing in the memory profile information indicating a relation between a path control method and a model of an external storage system;
   sending an inquiry command to each of the external storage systems;
   receiving inquiry data including information regarding a model of each of the external storage systems from each of the external storage systems;
   detecting a model of each of the external storage systems by referring to the received inquiry data; and
   setting path control methods which are used to transfer data to each of the external storage systems based on the detected model of each of the external storage systems and the profile information.

8. A method according to claim 7, wherein the control path methods include an active-active method in which a plurality of paths to an external storage system are used to transfer data to the external storage system.

9. A method according to claim 7, wherein the control path methods include a hot standby method in which a first path to an external storage system is used to transfer data to the external storage system and a second path to an external storage system is only used when the first path is busy.

10. A method according to claim 7, wherein the control path methods include a cold standby method in which a first path to an external storage system is used to transfer data to the external storage system and a second path to an external storage system is only used when failure has occurred on the first path.

11. A method according to claim 7, wherein the profile information further indicates a relation between a time out threshold and a model of an external storage system, and said method further comprising:

setting a time out threshold for each of the external storage systems based on the detected model of each of the external storage systems and the profile information.

12. A method according to claim 11, said method further comprising:

sending an input/output request to each of the external storage systems; and sending an error notice to the host computer in the case that the time out threshold for each of the external storage systems is exceeded before receiving a response to the input/output request from each of the external storage systems.

* * * * *